United States Patent
Janoska et al.

(10) Patent No.: US 6,647,477 B2
(45) Date of Patent: Nov. 11, 2003

(54) TRANSPORTING DATA TRANSMISSION UNITS OF DIFFERENT SIZES USING SEGMENTS OF FIXED SIZES

(75) Inventors: Mark W. Janoska, Carleton Place (CA); Henry Chow, Kanata (CA); Hossain Pezeshki-Esfahani, Ottawa (CA)

(73) Assignee: PMC-Sierra Ltd., Burnaby (CA)

( * ) Notice: Subject to any disclaimer, the term of this patent is extended or adjusted under 35 U.S.C. 154(b) by 173 days.

(21) Appl. No.: 09/969,806

(22) Filed: Oct. 4, 2001

(65) Prior Publication Data

US 2002/0066000 A1 May 30, 2002

Related U.S. Application Data

(60) Provisional application No. 60/238,024, filed on Oct. 6, 2000.

(51) Int. Cl.[7] ................................................. G06F 1/00
(52) U.S. Cl. ............................ 711/168; 711/171; 711/5; 370/230.1; 370/235
(58) Field of Search ................................. 711/168, 171, 711/5; 370/230.1, 235

(56) References Cited

U.S. PATENT DOCUMENTS

| | | | |
|---|---|---|---|
| 5,610,918 A | | 3/1997 | Kamo et al. |
| 5,724,358 A | | 3/1998 | Headrick et al. |
| 5,802,052 A | * | 9/1998 | Venkataraman ........ 370/395.72 |
| 5,809,012 A | | 9/1998 | Takase et al. |
| 5,860,149 A | * | 1/1999 | Fiacco et al. ................ 711/209 |
| 6,128,295 A | * | 10/2000 | Larsson et al. ............. 370/389 |
| 6,226,685 B1 | | 5/2001 | Chen et al. |
| 6,418,077 B1 | * | 7/2002 | Naven ......................... 365/233 |

* cited by examiner

Primary Examiner—Donald Sparks
Assistant Examiner—K Takeguchi
(74) Attorney, Agent, or Firm—Shapiro Cohen

(57) ABSTRACT

A data traffic management system that has the capability of writing data to the buffer memory at twice its normal rate. The data traffic management system uses a pointer structure that can reference either a single or a dual segment memory bank. A dual segment memory bank enhances the write capability of the data traffic management system by allowing two segments to be simultaneously written to both segment memory banks, with one segment being written to each bank. A pointer data structure with a single/dual indicator (S/D indicator) is used for referencing the memory banks. If the S/D indicator has a D entry, then a dual segment memory bank is addressed. The S/D indicator will have an S entry if a single segment memory bank is addressed. Based on the contents of the S/D indicator, either a single fixed size data segment is written to a single memory bank or two fixed size data segments are written to a dual segment memory bank.

8 Claims, 12 Drawing Sheets

TRANSPORTING DATA TRANSMISSION UNITS OF DIFFERENT SIZES USING SEGMENTS OF FIXED SIZES

This application relates to U.S. Provisional Patent Application No. 60/238,024 filed Oct. 6, 2000.

FIELD OF INVENTION

The present invention relates to increasing data transfer rates in a system that divides data transmission units of different sizes into segments of a fixed size. More particularly, the invention relates to a method for enhancing the write capability of a data traffic management system.

BACKGROUND TO THE INVENTION

In the field of data communications, data traffic management has become an increasingly important issue. Data traffic management is at the core of maintaining an effective data communications system. A data traffic management system manages the arrival and departure of data transmission units by buffering data transmission units. It should be noted that the term data transmission unit (DTU) will be used in a generic sense throughout this document to mean units which include transmitted data. Thus, such units may take the form of packets, cells, frames, or any other unit as long as data is encapsulated within the unit. Thus, the term DTU is applicable to any and all packets and frames that implement specific protocols, standards or transmission schemes.

As the rate of arrival of data traffic increases, the data traffic management system ensures that all DTUs are received and stored in a buffer memory if they are not immediately transmitted. Without proper data traffic management, DTUs may be lost and, as a result, entire streams of data communication may be compromised. To prevent this, the data traffic management system is included a processor and buffer memory to receive and store incoming data traffic that cannot be immediately transmitted. If there is a large influx of DTUs, a large buffer memory may be necessary to store incoming DTUs efficiently until they can be processed for routing to their destinations.

Data traffic management must also address other data traffic issues caused by the different sizes of incoming DTUs. Most network elements, such as switches and routers, require that these DTUs of different size be divided into fixed size segments. The data traffic management system must therefore measure the size of each incoming DTU and divide the DTU into fixed size segments based on that measurement. Using fixed size segments, these network elements are able to process each segment in a shorter processing cycle. Inefficiencies occur due to the fixed processing speeds of the system processor and the limited amount of data transfer per unit time between the processor and the buffer memory. The processing speeds of the system processor and the amount of data transferred between the processor and the buffer memory cannot be easily increased. For data traffic management systems, the time used by the processor to process the segments may already be in the order of 10–40 ns. Decreasing this processing time for each segment may therefore be difficult.

The amount of buffer memory is crucial for buffering additional DTUs when there are higher influx rates of data traffic. For a high speed line, the data traffic management system may maintain a pool of fixed size buffer structures. These buffer structures are used when, upon arrival of data at the input side of the data traffic management system, DTUs of different size are divided into fixed size segments and stored in a buffer structure. The buffer is structured such that it is divided into a number of fixed size memory locations. Each memory location is capable of storing a fixed size segment. Therefore, the buffer can be filled to capacity or at least more efficiently utilized. If the time required to store each fixed length segment is decreased then the processing time required to store a given DTU is correspondingly decreased. This is due to the fact that each DTU is made up of multiple fixed size segments. Thus, if the time required to store each segment decreases then the total time required to store each DTU decreases. Shorter processing times translate into an improvement in the overall speed of the data traffic management system, as many systems are capable of processing many segments in parallel.

Ideally, each DTU produces a whole number of segments of a predetermined fixed size. In cases where a DTU does not produce a whole number of segments, an additional, under-utilized but fixed size segment is needed. Since the input processor only writes one fixed size segment at a time, the processor is required to devote an entire processing cycle to buffer an underutilized fixed size segment in buffer memory. Such inefficiencies may lead to the data traffic management system being unable to meet data traffic demands at the output side of the data traffic management system. One remedy to this problem is to increase the amount of data being transferred between the processor and the buffer memory.

The present invention seeks to provide a data traffic management system which increases the amount of data transfer per unit of time of DTUs of different sizes into the buffer memory.

SUMMARY OF THE INVENTION

The present invention is a method of increasing the amount of data transferred per unit of time to a buffer memory for each write operation in a data traffic management system. The present invention seeks to provide a data traffic management system that has the capability of writing data to the buffer memory at twice its normal rate. The data traffic management system uses a pointer structure that can reference either a single or a dual segment memory bank. A dual segment memory bank enhances the write capability of the data traffic management system by allowing two segments to be simultaneously written to both segment memory banks, with one segment being written to each bank. A pointer data structure with a single/dual indicator (S/D indicator) is used for referencing the memory banks. If the S/D indicator has a D entry, then a dual segment memory bank is addressed. The S/D indicator will have an S entry if a single segment memory bank is addressed. Based on the contents of the S/D indicator, either a single fixed size data segment is written to a single memory bank or two fixed size data segments are written to a dual segment memory bank. The use of dual segment memory banks referenced by a single pointer doubles the write capability of the input processor, as two fixed size segments may be written simultaneously to a dual segment memory bank. The end result is that the processing speed of the input processor of the data traffic management system remains the same while the amount of data capable of being written to the buffer per processing cycle has been doubled. The input processor will still process one DTU at a time but it can now buffer two segments per processing cycle.

This method reduces the overflow of DTUs at the input side of the data traffic management system if the data traffic management system is unable to handle the influx of different size DTUs. The present invention is ideally suited for switch cores where DTUs of different sizes arrive at a high influx rate.

In a first aspect, the present invention provides a system for processing incoming data transmission units of different size, the system including:
a) a first memory means having at least one set of two parallel banks;
b) a second memory means containing a plurality of pointers, each pointer being able to simultaneously reference two parallel memory locations in the at least one set of two parallel memory banks, each of the two parallel memory banks in a set having parallel memory locations referenced by each pointer;
c) processing means for receiving an incoming data transmission unit and dividing the incoming data transmission unit into at least two fixed size segments and writing the at least two fixed size segments in the first memory means; and
d) controlling means for updating each index pointer that points to a pointer in the second memory means and sending the index pointer to the processing means, the pointer being one of the plurality of pointers.

In a second aspect, the present invention provides a system for processing incoming data transmission units of different size, the system including:
a) a first memory means having at least one set of two parallel banks;
b) a second memory means containing a plurality of pointers, each pointer being able to simultaneously reference two parallel memory locations in the at least one set of two parallel memory banks, each of the two parallel memory banks in a set having parallel memory locations referenced by each pointer;
c) processing means for receiving an incoming data transmission unit and dividing the incoming data transmission unit into at least two fixed size segments and writing the at least two fixed size segments in the first memory means; and
d) controlling means for updating each index pointer that points to a pointer in the second memory means and sending the index pointer to the processing means, the pointer being one of the plurality of pointers.

In a third aspect, the present invention provides a method of processing a data transmission unit of different size, the method including the steps of:
a) determining a size of the data transmission unit;
b) if the size of the data transmission unit is greater than a predetermined fixed size of a segment, executing the following steps:
b1) dividing the data transmission unit into at least two portions, each portion having a maximum size equal to the predetermined fixed size of a segment;
b2) retrieving at least one and at most two portions from the data transmission unit;
b3) if one portion is retrieved from step b2), executing the following steps:
b3-1) sending a signal to controlling means, the signal indicating that one portion has been retrieved;
b3-2) retrieving a write index from controlling means to processing means, the write index containing a memory address;
b3-3) assigning the memory address to the one portion retrieved in step b2);
b3-4) assigning a pointer to reference the memory location using the memory address assigned in step b3-3);
b3-5) setting a field indicator in the pointer to indicate that one portion is being referenced;
b3-6) storing the one portion in a memory location of a first memory bank, the memory location having the memory address assigned in step b4-3);
b3-7) storing the pointer in pointer memory;
b4) if two portions are retrieved from step b2), executing the following steps:
b4-1) sending a signal to controlling means, the signal indicating that two portions have been retrieved;
b4-2) retrieving a write index from controlling means to processing means, the write index containing a memory address common to a first memory bank and a second memory bank;
b4-3) assigning the memory address to the two portions;
b4-4) assigning a pointer to reference two memory location using the memory address assigned in step b4-3);
b4-5) setting a field indicator in the pointer to indicate that two portions are being referenced, the two portions comprising a first portion and a second portion;
b4-6) storing the first portion in a memory location in the first memory bank and storing the second portion in a memory location in the second memory bank, both memory locations having the memory address assigned in step b4-3);
b4-7) storing the pointer in pointer memory;
b4-8) repeating step b2) to b4), until the data transmission unit has been retrieved, and assigning the pointer to reference a pointer assigned to the at least one and at most two portions to be retrieved.

In a fourth aspect, the present invention provides a method of processing a request for retrieving a data transmission unit from memory, the method including the steps of:
a) sending a signal to controlling means, the signal indicating that a data transmission unit has been requested;
b) retrieving a pointer index from controlling means to processing means;
c) reading a pointer from pointer memory corresponding to the pointer index retrieved in step b);
d) determining whether one or two portions are referenced by the pointer;
e) determining whether the pointer references an immediately succeeding pointer in pointer memory;
f) if one portion is referenced, executing the following steps:
f1) identifying a memory location referenced by the pointer using a memory address contained in the pointer;
f2) retrieving a first portion from the memory location in a first memory bank;
g) if two portions are referenced, executing the following steps:
g1) identifying two memory locations referenced by the pointer using a memory address contained in the pointer;
g2) retrieving a first portion from a first memory location in a first memory bank and retrieving a second portion from a second memory location in a second memory bank, both memory locations identified in step g1);

g3) incrementing the pointer index;

g4) if the pointer references the immediately succeeding pointer determined in step e), repeating step c) to g).

BRIEF DESCRIPTION OF THE DRAWINGS

A better understanding of the invention will be obtained by a consideration of the detailed description below, in conjunction with the following drawings, in which.

DETAILED DESCRIPTION

Figure 1:
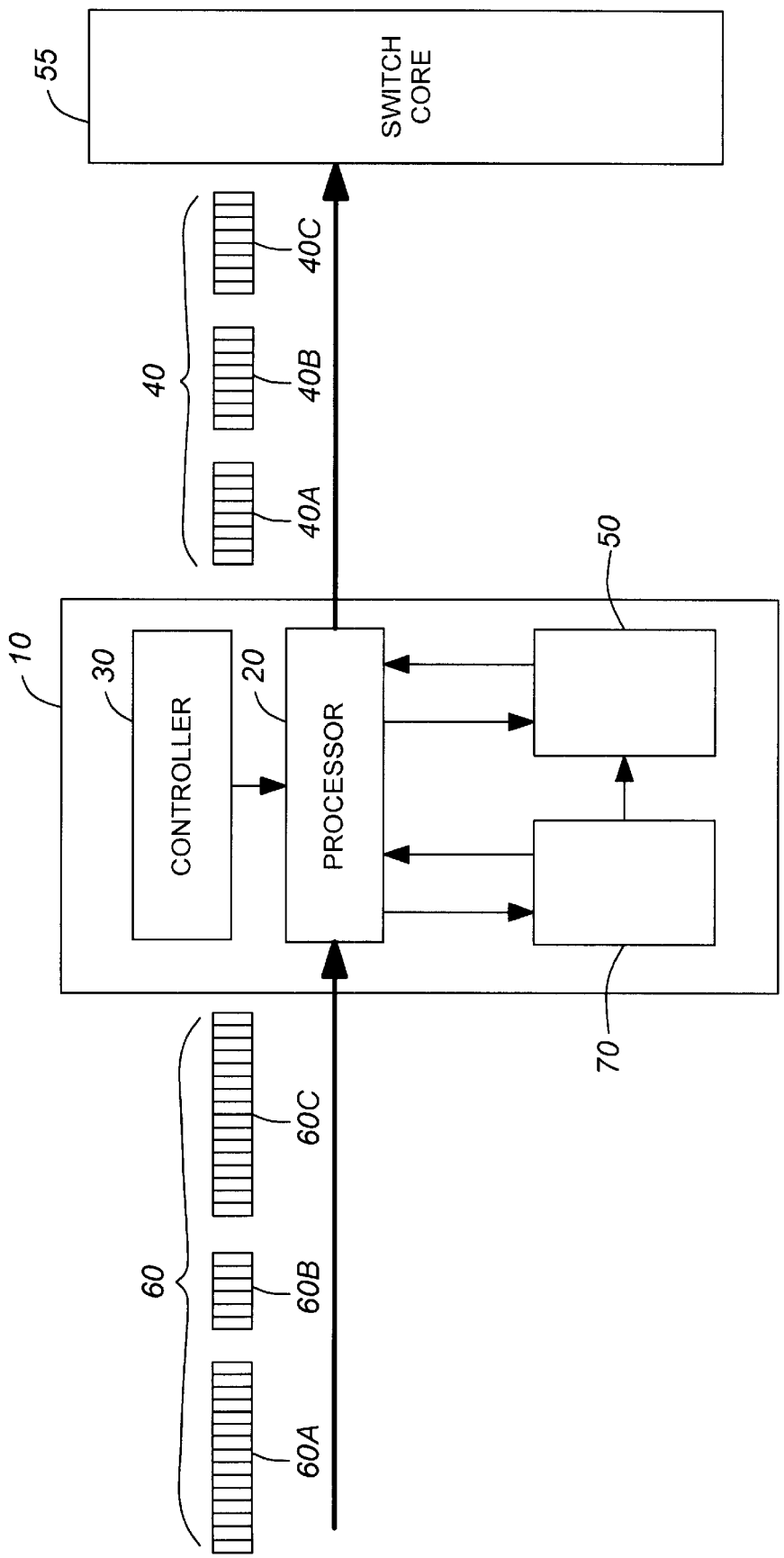
FIG. 1 is a block diagram of a data traffic management system according to the prior art.

Referring to FIG. 1, a traffic management system 10 is illustrated. The traffic management system 10 includes a processor 20, a controller 30, buffer memory 50, and pointer memory 70. The traffic management system 10 receives differently sized data transmission units 60 and outputs uniformly sized segments 40 for use by a switch core 55. The differently sized DTUs 60 are received by the traffic management system 10 and divided into uniformly sized segments 40, buffered in the buffer memory 50, and output as uniformly sized segments 40 for the switch core 55. It should be understood that the term size in this document refers to the number of bytes of data or the number of units of data a DTU or a segment has.

The processor 20 is coupled to the controller 30, the pointer memory 70, and the buffer memory 50. The controller 30, when required, can communicate with either the pointer memory 70 and the buffer memory 50 through the processor 20. In terms of function, the controller manages the allocation of memory locations in the buffer memory 50 by keeping a record of which locations are occupied and which locations are vacant. The pointer memory 70, by using its pointers, records which memory locations are occupied by which segments and which segments belong to which DTUs. Again, the pointer memory 70 is managed by the controller 30 as the controller 30 determines which pointer points to which memory location. The processor 30 manages the flow of any control information between the controller 30, the buffer memory 50, and the pointer memory 70. In addition to this function, the processor 20 also divides the DTU into multiple uniformly sized segments.

Each differently sized DTU 60a, 60b, 60c is individually received by the traffic management system 10 and directed to the processor 20. Once the differently sized such as DTU 60C reaches the processor 20, the processor 20 sends a notification signal to the controller 30 that a new differently sized DTU has arrived.

At the same time that the processor 20 is sending the notification signal to the controller 30, the processor 20 is dividing the newly arrived differently sized DTU into uniformly sized segments. The uniform size of the segments is predetermined and fixed and corresponds to a size that is useful for the switch core 55. This division is executed by first determining how many segments with the uniform size can fit into the newly arrived DTU. Thus, if the uniform size is given as 30 bytes and a DTU has 80 bytes of data, then this DTU can be divided into 3 segments—two segments of 30 bytes each and a third segment of 20 bytes. Once the new DTU has been divided into uniformly sized segments, these segments can now be buffered in the buffer memory 50.

Upon receipt of the notification signal, the controller 30 issues a write index to the processor 20. This write index is used by the controller 30 to indicate which memory location in the buffer memory 50 is to be used to buffer the first uniformly sized segment from the differently sized DTU.

Since the segments are uniformly sized, and since the processor 20 has determined how many segments are generated from DTU 60C, the buffering of these segments can be accomplished in two ways. First, the controller 30 may issue en masse x memory locations for the x segments generated from the now divided DTU. These x segments are then individually stored in the x memory locations. The second way involves repeated requests to the controller 30 from the processor 20. For each uniformly sized segment generated from the now divided DTU, the processor 20 requests a single memory location in the buffer memory 50. Each one of the generated segments is thus assigned a memory location in the buffer memory 50.

Prior to buffering the generated segments, each memory location which a generated segment is to occupy will be referenced by a pointer in the pointer memory 70. For each memory location assigned by the controller 30, a corresponding pointer is acquired from the pointer memory 70. This pointer memory keeps track of which memory location is occupied by which segment.

To determine which segments belong to which DTU, the segments belonging to a DTU are grouped together by way of their pointers in the pointer memory 70. For a given DTU, the pointers corresponding to the segments from that DTU are linked together in a sequence that mirrors the sequence in which the segments must be retrieved. Thus, if a DTU generated segments A, B, C, and D, in that order, then the pointers to the memory locations occupied by these segments are linked in the same order. If segments A, B, C, and D are referenced by pointers $P_A$, $P_B$, $P_C$, and $P_D$, respectively, then pointer $P_A$ links to pointer $P_B$ which links to pointer $P_C$ which in turn, links to pointer $P_D$. By linking the pointers which reference the segments from a single DTU, these segments are effectively grouped together. This linked list of pointers thereby forms a record of which memory locations are occupied by segments from a particular DTU. The linking between pointers may take the form of a field in the pointer that points to the next pointer in the linked list.

Once the proper pointers have been assigned and linked together, the segments may now be stored in the buffer memory 50. This is done sequentially as each segment is, in turn, stored or buffered in the memory location pointed to by its assigned pointer. To record which pointer linked list corresponds to which DTU, the controller 30 keeps a record of the concordance between DTUs and the pointer linked lists.

To retrieve a DTU from the buffer memory 50, the processor 20, which does the retrieving, merely follows the linked list of pointers for the particular DTU requested. Retrieval begins with a request for a particular DTU buffered in the buffer memory. This request may be generated by the processor 20 or the controller 30 or by an external signal. Regardless of how the request originates, the particular DTU must be identified. Once the DTU is identified, the controller 30 checks its concordance between pointer linked lists and buffered DTUs to find the requested DTU. Once the relevant linked list of pointers is found, the first pointer in the list is retrieved by the processor 20 using a pointer index formulated by the controller 30. The pointer index refers to the first pointer in the linked list of pointers. The contents of the memory location to which this pointer points is then retrieved using the link from the previous pointer. The contents of the memory location to which this pointer points is then retrieved by the processor 20 and output from the traffic management system 10 as uniformly sized segment 40A. The next pointer in the list can then be retrieved, and segments 40B, 40C are output until the whole of the original DTU 60C has been output from the traffic management system 10. This process continues until all the pointers are retrieved and the contents of the memory locations to which they pint are retrieved and output from the traffic management system 10

Figure 2:
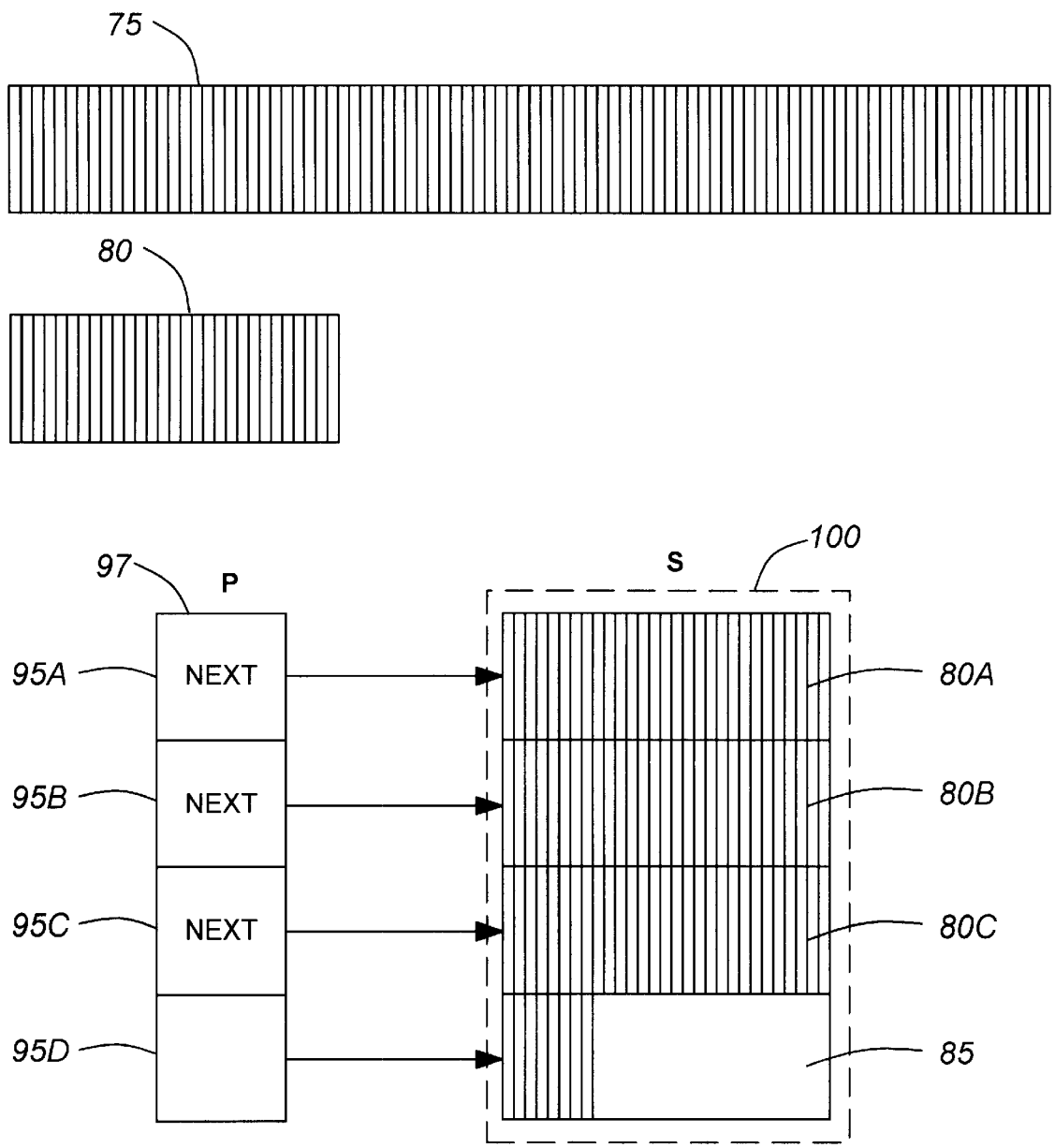
FIG. 2 illustrates an example of how buffer resources are organized according to the prior art.

FIG. 2 illustrates an example of the segmenting and the storing of a different size DTU using the data traffic management system of FIG. 1. For this example, it is assumed that the DTU of 75 that arrives is 190 bytes the fixed length segment 80 is 60 bytes; upon arrival at the data traffic management system 10, the processor 20 measures the actual size of the DTU 75 and divides this DTU 75 into segments 80A, 80B, 80C, and 85. The fourth segment 85 will only partially fill the 60 byte space. As each segment 80A, 80B, 80C of 60 bytes and one segment of 10 bytes is processed to the memory bank 100, a pointer 95A, 95B, 95C, 95D is in turn assigned to each of the segments. The pointer 95A references segment 80A; the pointer 95B references segment 80B; the pointer 95C references segment 80C; and the pointer 95D references the segment 85. Each pointer has a next field which can be used for a sequence 97, that indicates whether the pointer references the next pointer in the pointer sequence. Pointers that are referenced by an entry in a specific pointer sequence also reference segments that belong to a single DTU. Each segment is stored in the single memory bank 100. As illustrated, the memory bank 100 stores four segments, three segments being 60 bytes in size, and one remaining segment of 10 bytes in size. An entire processing cycle is required to store each of these segments into the memory bank 100.

Figure 3:
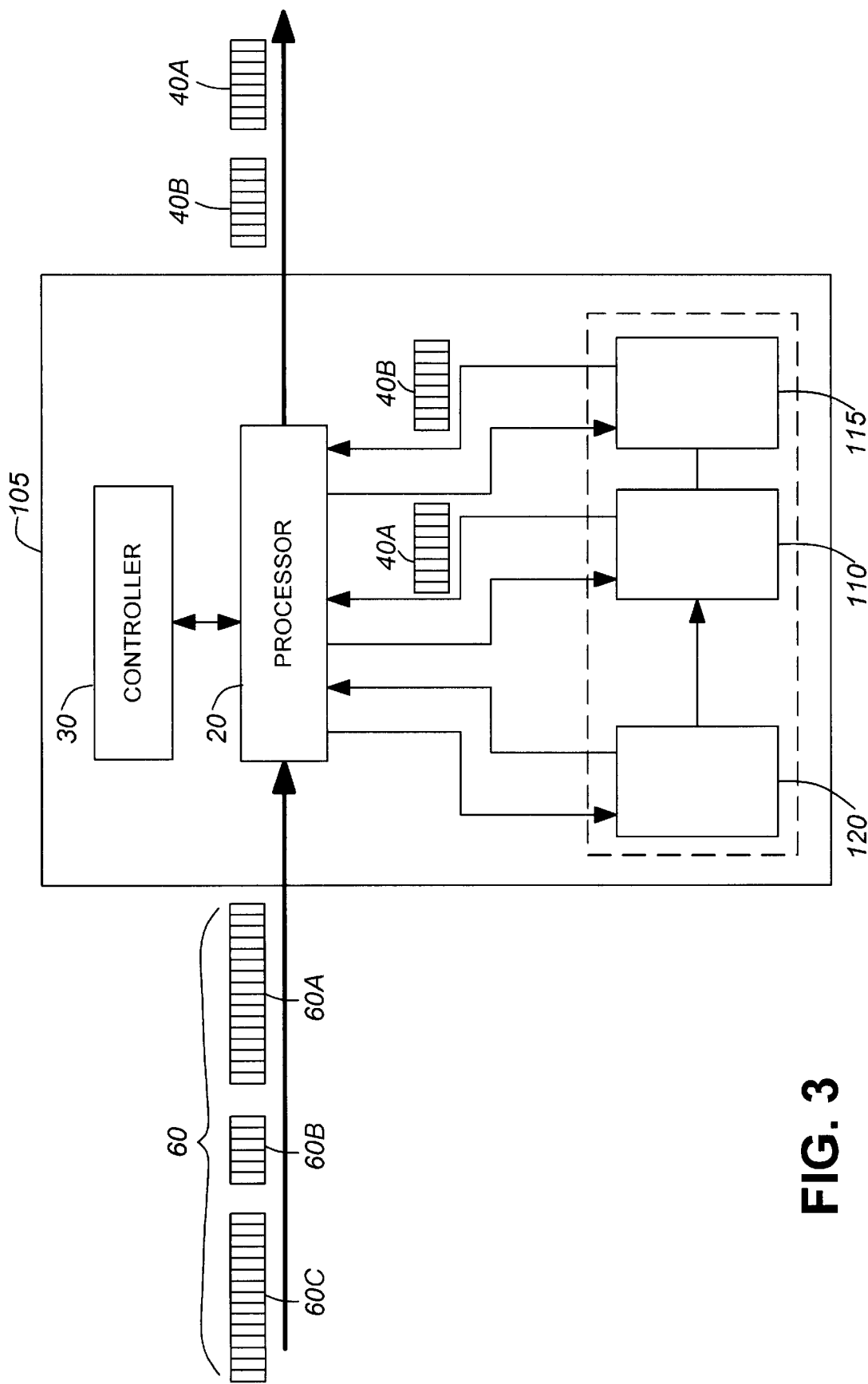
FIG. 3 is a block diagram of a data traffic management system with dual segment memory banks and enhanced pointer manipulation according to a first embodiment of the present invention.

FIG. 3 is a block diagram of a data traffic management system 105 according to the present invention. The data traffic management system 105 again includes a controller 30 and processor 20. According to the present invention, the processor 20 addresses dual memory banks 110 and 115. These two memory banks 110 and 115 are equivalent in size and have an equivalent number of memory locations in both memory banks 110 and 115. Each memory location in one memory bank has a corresponding memory location in the other memory bank such that the two memory locations have the same address and are referenced using a single pointer. The pointers, maintained in the pointer memory 120, have the ability to reference a memory location in both memory banks 110 and 115. Operating through the processor 20 the controller 30 updates a pointer index in order to determine which pointers correspond to the various incoming DTUs. As a DTU 60 arrives at the input processor 20, the DTU is divided into fixed size segments 40A and 40B. If the size of the incoming DTU had been less than the predetermined fixed size of a segment, then the DTU would have been processed as a fixed size segment and stored in memory bank 110. In this case, the size of the DTU 60 is greater than the predetermined fixed size of a segment. For each processing cycle, the processor retrieves enough data from the DTU 60 to produce two segments of a predetermined fixed size. A first segment is written in a memory location in memory bank 110 while a second segment is simultaneously written to a corresponding memory location in memory bank 115. Depending on the size of the DTU, the end of the DTU may be stored as a single segment or as two separate segments. The capability of the processor 20 to write to two memory banks simultaneously is achieved by using a single pointer which references two memory locations.

In the pointer data structure, a memory address common to the dual memory banks enables the pointer to reference two memory locations. The pointer data structure has an S/D indicator and a memory address that enables the pointer to reference a memory location in memory bank 110, as well as a corresponding memory location in memory bank 155. To reference both memory locations, the S/D indicator field in the pointer data structure must be enabled.

To retrieve a specified DTU 60 from the dual memory banks 110 and 115, the processor 20 signals the controller 30 that the DTU 60 has been requested. The controller 30 then sends a pointer index to the processor 20. The pointer index points to a pointer in the pointer memory that references the first segment or first pair of segments of the DTU 60 stored in memory banks 110, 115. The processor 20 reads in the data contents of the pointer. The pointer indicates the memory address associated with the first segment of the DTU, as well as, whether one or dual memory banks are referenced. In either case, the processor will retrieve either one or two segments from the memory locations referenced by the pointer. As shown in FIG. 3, the two segments 40A or 40B are retrieved in a sequential manner, such that the first segment 40A is retrieved from a memory location in the first memory bank 110 and then the second segment 40B is retrieved from a corresponding memory location in the second memory bank 115. Since the DTU 60 was divided into two segments, the first pointer references the next pointer located in the pointer memory. If the DTU 60 had been divided in to three or more segments, the processor 20 would then retrieve additional segments referenced by the next pointer from the dual memory banks 110 and 115. The sequence of pointers reflects the sequence of DTUs as they were stored in buffer memory.

Figure 4:
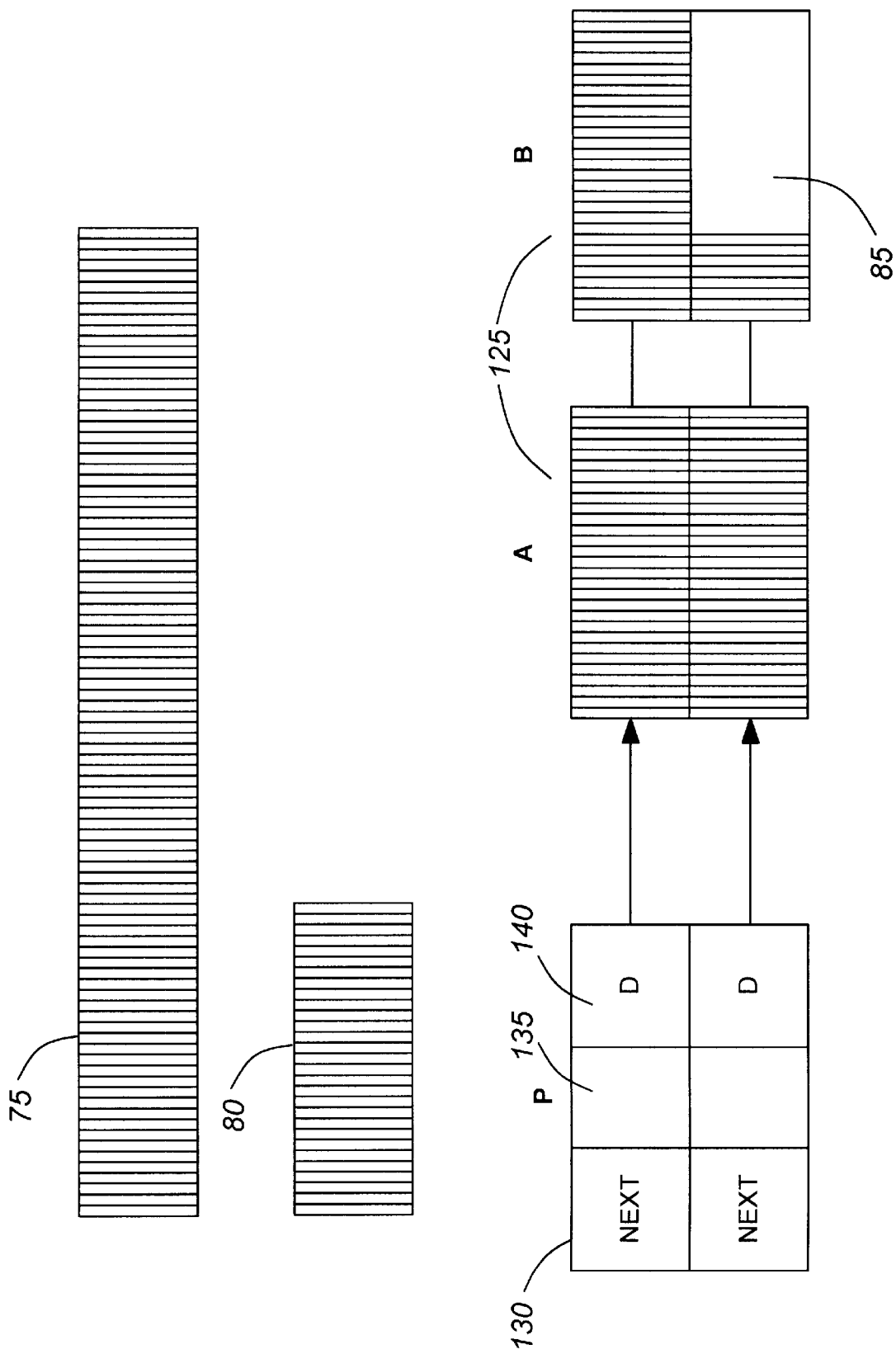
FIG. 4 illustrates an example of how buffer resources are organized according to a first embodiment of the present invention.

FIG. 4 illustrates the enhanced pointer data structure using the example of FIG. 2. According to the example, the DTU 75 is 190 bytes in size and the system processes fixed size segments 80 of 60 bytes. The processor 20 divides the DTU 75 into four segments 80A, 80B, 80C, 85. The processor 20 then signals the controller that a DTU 75 has arrived in order to retrieve a write index that points to next available memory locations for storing segments. The write index supplied by the controller contains the memory address of memory locations in both memory banks 110 and 115. The processor then assigns the memory address to the two first segments 80A and 80B. Once a memory address is assigned to segments 80A and 80B, the write index is then updated with a memory address associated with the next available memory location. A pointer is assigned to the memory address, in the memory field 135, to reference two corresponding memory locations in the dual memory banks 110 and 115. The pointer structure enables the pointer 130 to reference either single or dual segment memory banks. Depending on the format chosen by the designer, a 1 or 0 may be placed in the S/D indicator field to indicate whether the pointer references a first memory bank 110 or dual memory banks 110 and 115. After assigning the pointer to reference the two memory locations, the first segment 80A is stored in the first memory location in the first memory bank 110 and the second segment 80B is stored in the second memory location in the second memory bank 115. As shown in FIG. 4, the D entry 140 in the S/D indicator field enables the pointer to reference the two segments 80A and 80B. It follows that the next two segments 80C and 85 are also written in corresponding memory locations in a first memory bank 110 and a second memory bank 115. The pointer data structure enables the processor to write to two memory banks simultaneously and thereby increases the amount of data being stored per processing cycle. The processor stores two segments per processing cycle in corresponding memory locations using the same memory address, while the prior art technique of FIG. 2 stores only a single segment per processing cycle.

Figure 5:
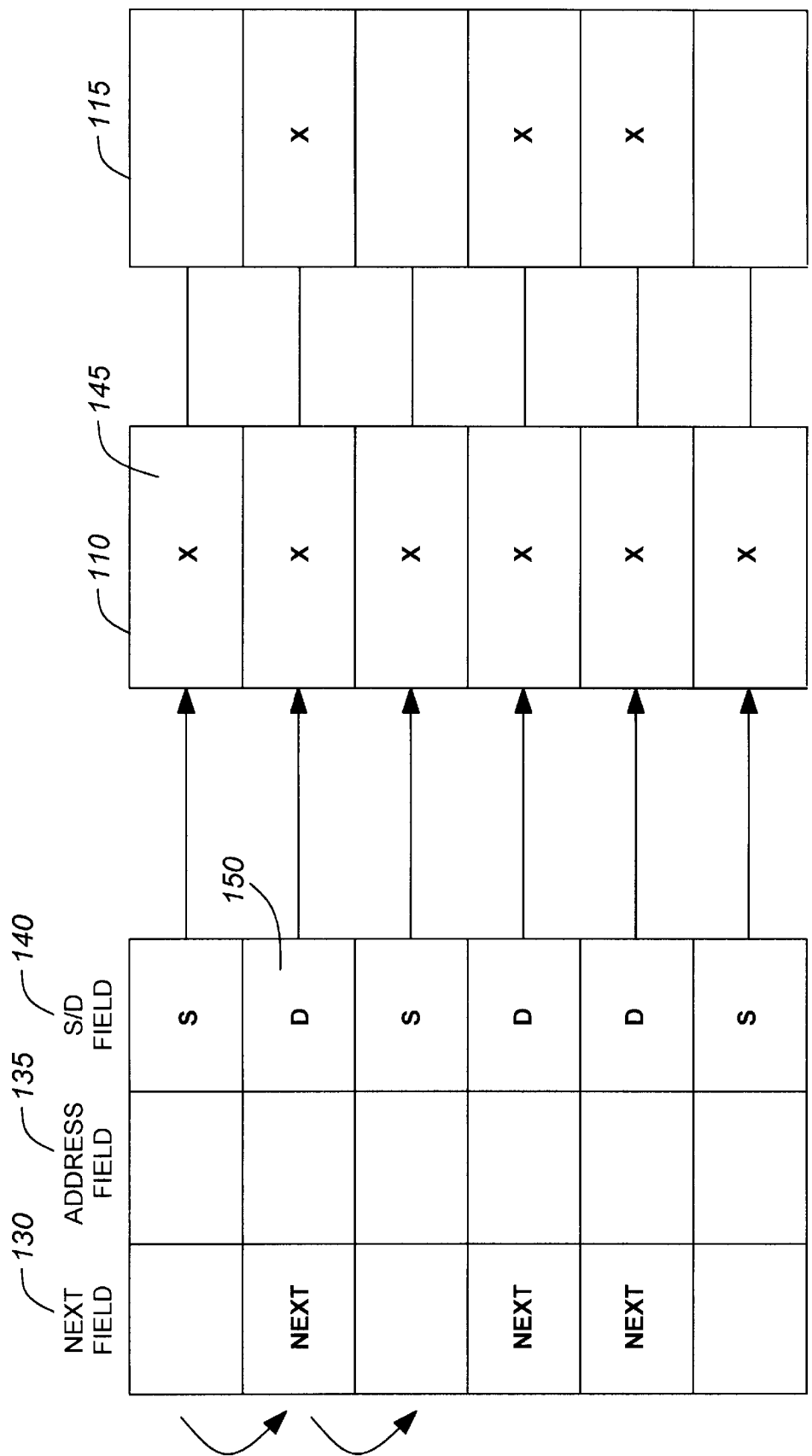
FIG. 5 illustrates an example of an enhanced pointer structure according to a first embodiment to the present invention.

FIG. 5 illustrates an example of the pointer data structure. Each pointer has a next field 130, a memory address field 135 and S/D indicator field 140. The next field 130 is used to indicate the next pointer in the sequence. The entry in the next field refers to the next pointer in the sequence of pointers in the pointer memory. The pointers in a given sequence also reference a series of segments that belong to the same DTU. The memory address field 135 refers to the memory address assigned to the pointer. The S/D indicator fields 140 of the pointer data structure enables a single pointer to reference a memory location in both memory banks 110 and 115 using the exact same memory address in the memory address field. The entry X as at 145 in the memory banks indicates where segments would be stored in the memory bank according the example.

Figure 6:
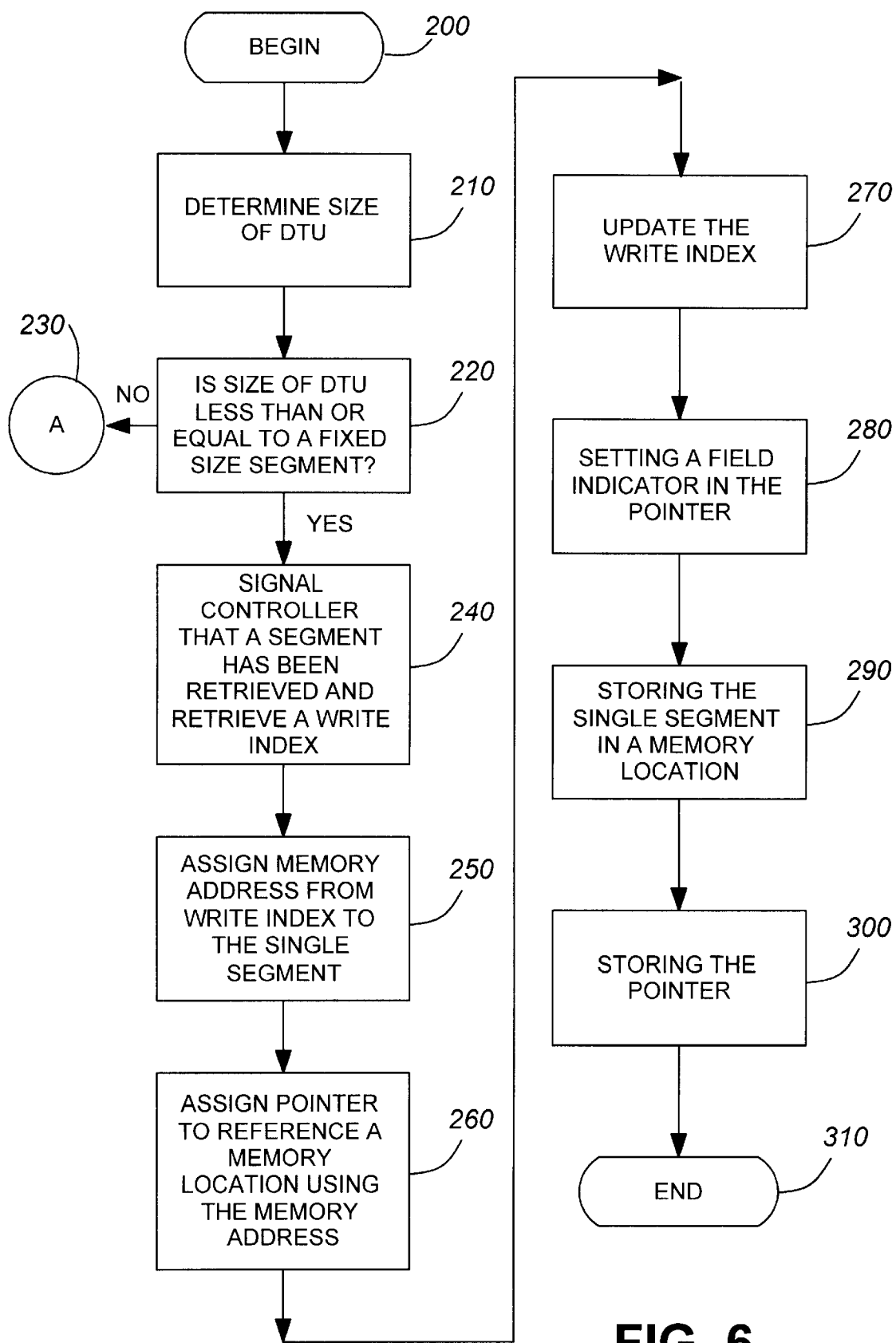
FIG. 6 is a flowchart detailing the process for storing DTUs of a size not greater than a predetermined fixed size according to a second embodiment of the present invention.

FIG. 6 is a flowchart illustrating the steps in a method for writing an incoming DTU into memory according to the present invention. The process begins at step 200 and is followed by a step for determining the size of the incoming DTU, step 210. The next step 220 is to determine if the size of the DTU is less than or equal to the predetermined fixed size of a segment. If not, then the process continues with connector A 230. If yes, then the processor 20 signals the controller 30 that the DTU has been retrieved as a single segment in step 240. In addition, the processor retrieves a write index from the controller. The contents of the write index include a memory address corresponding to next available memory location. The following step 250 assigns the memory address to the single segment. The memory address corresponds to two memory locations, each memory location being located in a separate memory bank. Step 260 assigns a pointer to reference a memory location using the memory address assigned in step 250. The controller then updates the write index by incrementing its memory address in step 270, such that the write index points to the next available memory location. It then follows in step 280 that the field indicator in the pointer is set to indicate that a single segment is referenced. In step 290, the single segment is stored in a memory location in a first memory bank. The pointer is then stored in pointer memory and the process ends at step 310.

Figure 7:
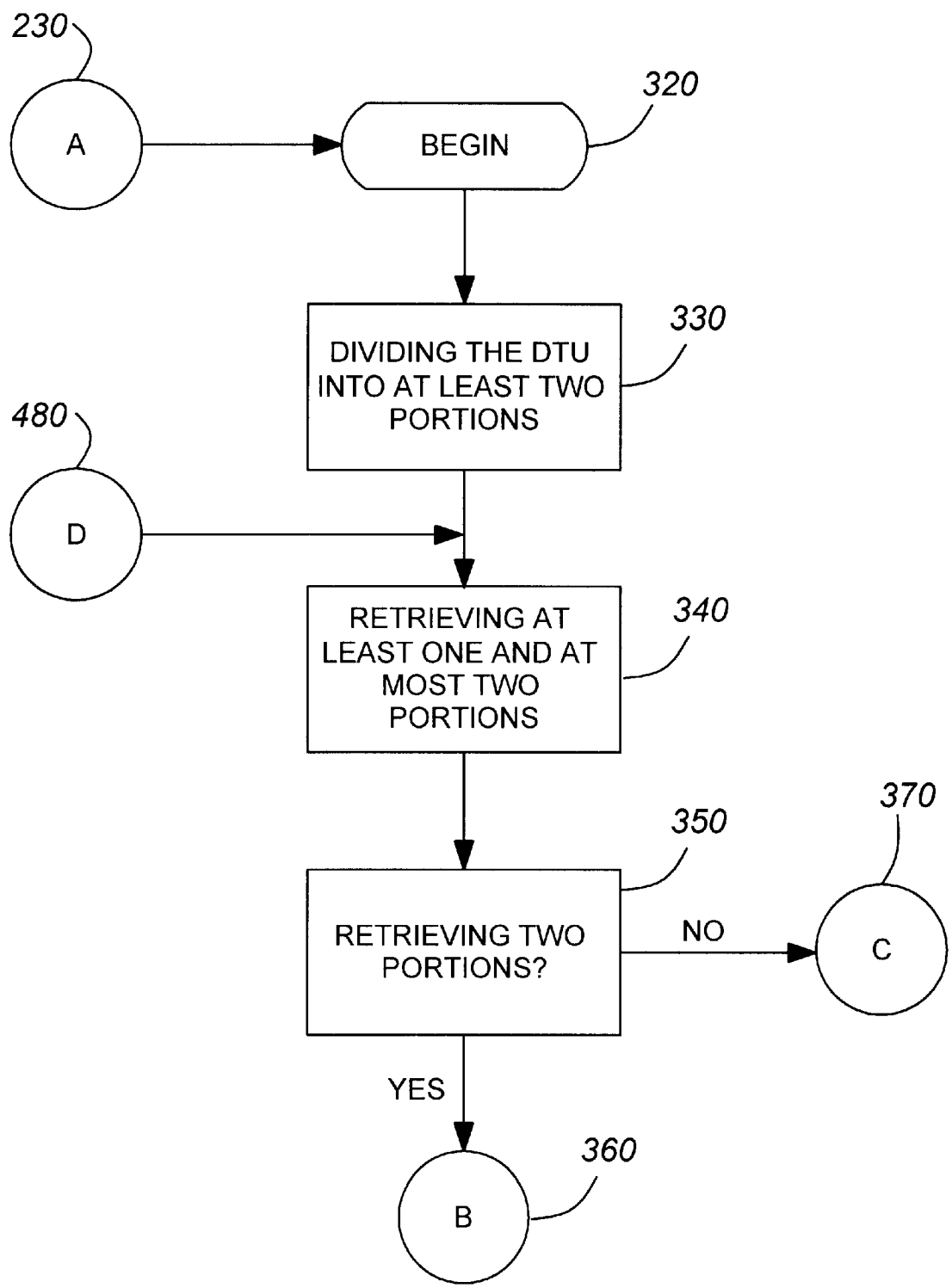
FIG. 7 is a flowchart detailing the process for storing DTUs of a size than a predetermined fixed size according to the second embodiment of the present invention.

FIG. 7 follows connector A 230 which begins a new process at step 320. The step 330 then divides the DTU into at least two portions, each portion having a maximum size equal to the predetermined segment size. The processor 30 retrieves two portions, if possible, from the DTU in step 340. The next step 350 determines if two portions have been retrieved. One portion would have been retrieved in cases where the DTU was divided into an uneven number of portions. If two portions have been retrieved, then the process follows connector B 360 and if not, then the process follows connector C 370.

Figure 8:
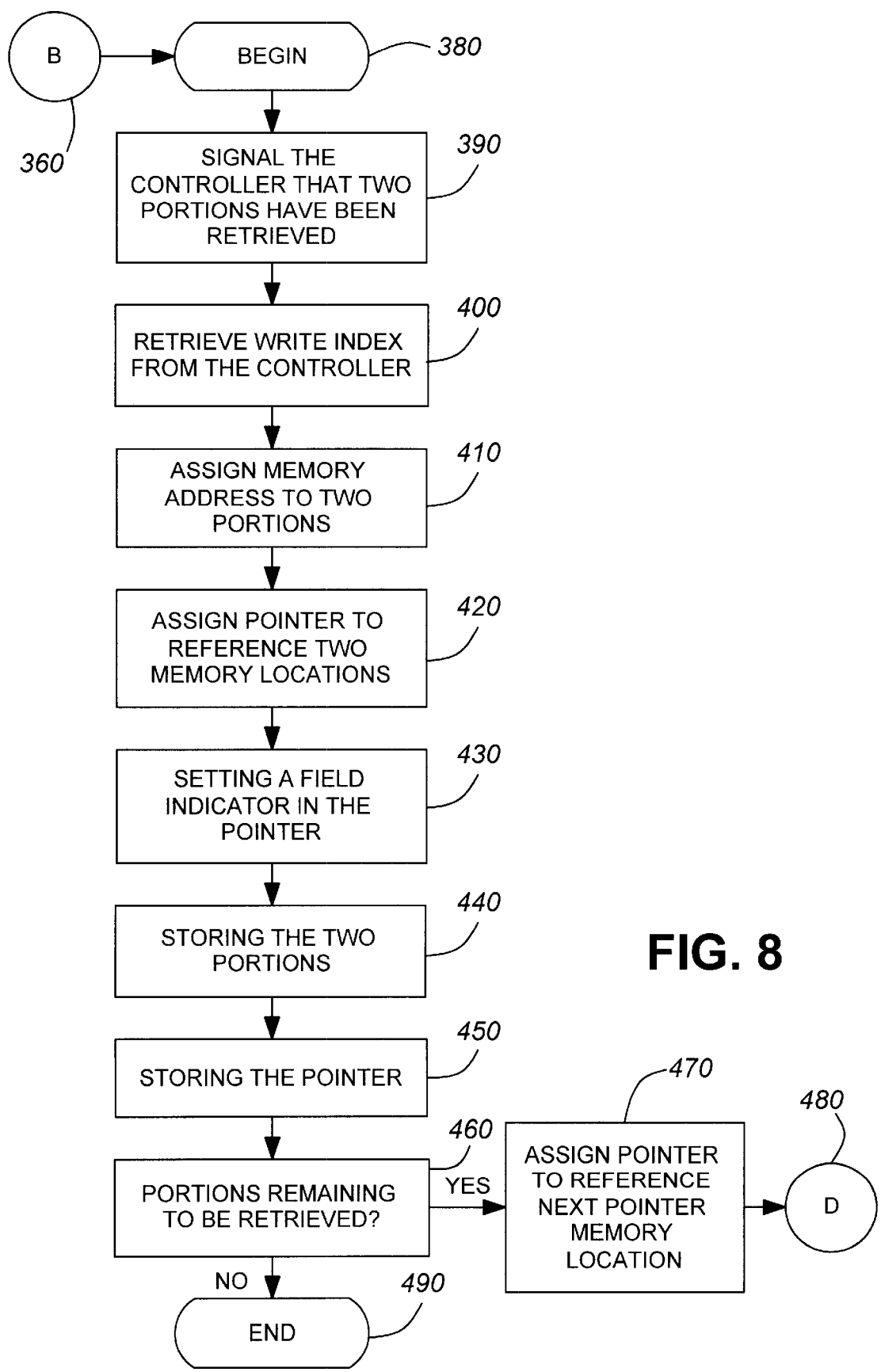
FIG. 8 is a flowchart detailing a sub-process for storing portions of the DTU according to a second embodiment of the present invention.

FIG. 8 follows connector B 360 which begins a new process at step 380. The processor signals the controller that two portions have been retrieved in step 390. It then follows that the processor will retrieve a write index from the controller in step 400. In step 410, the processor assigns a memory address to the two portions from the contents of the write index retrieved in step 400. A pointer is then assigned to reference two corresponding memory locations, in step 410. The next step 430, sets the field indicator in the pointer to indicate that the pointer references two segments, each segment in a first and second memory bank. Step 440 stores a first portion in a memory location in a first memory bank and a second portion in a corresponding memory location in a second memory bank. The two memory locations have the exact same memory address. Step 450 stored the pointer in a memory location in pointer memory. The next step 460 determines if any portions from the DTU remain to be retrieved. If yes, the step 470 updates the pointer stored in step 450 to reference the next pointer memory location. This process then continues with connector D 480 which begins at step 340. If not, then process that began at step 200 ends.

Figure 9:
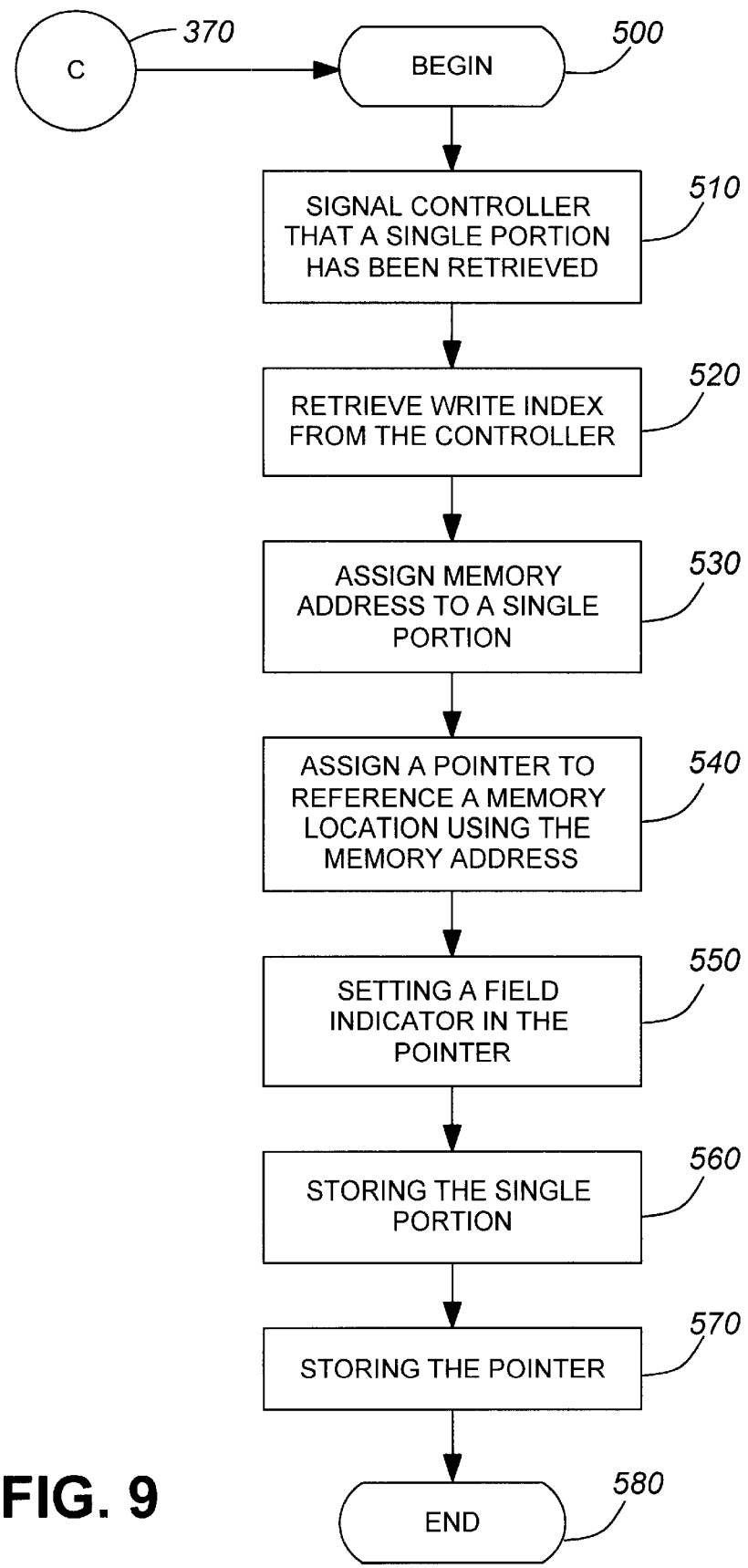
FIG. 9 is a flowchart detailing a sub-process for storing the end portion of the DTU according to the second embodiment of the present invention.

FIG. 9 follows connector C 370 which begins a new process at step 500. In step 510, the processor signals the controller that a single portion has been retrieved. The processor then retrieves a write index from the controller in step 520. The write index enables the processor to assign a memory address to a single portion in step 530. It then follows that in step 540 a pointer is assigned to reference a memory location using the memory address assigned in step 530. A field indicator is set in the pointer to indicate that a single portion is referenced in step 550. The single portion, which again has a size not greater than the predetermined segment size, is stored in the memory location of a first memory bank in step 560. The next step 570 stores the pointer in pointer memory. The process that began at step 200 ends at step 580.

Figure 10:
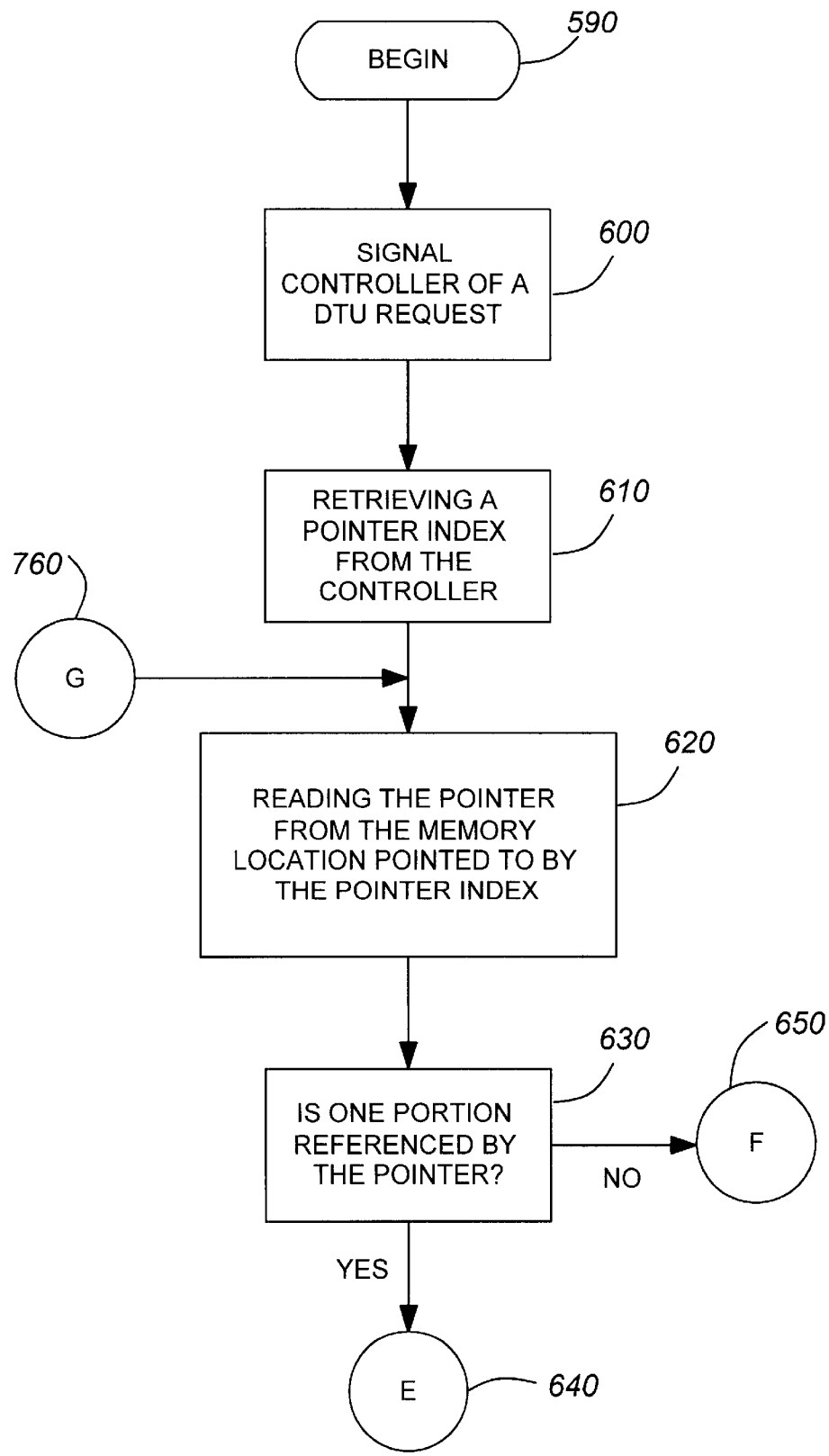
FIG. 10 is a flowchart detailing a process for retrieving stored DTUs from memory according to a third embodiment of the present invention.

FIG. 10 is a flowchart illustrating the steps in a method for retrieving a particular DTU from memory once the processor has requested the DTU. The process begins at step 590 and is followed by signalling the controller that a DTU has been requested in step 600. The processor then retrieves a pointer index from the controller in step 610. The pointer index, supplied by the controller 30, enables the processor 20 to point to a memory location in pointer memory where the pointer required is stored. In the next step 620, the pointer is read from the memory location in the pointer memory using the pointer index. Step 630 determines whether the pointer references one portion or two portions in the dual memory banks. If yes, then the process follows connector E 640 and if not, the process follows connector F 650.

Figure 11:
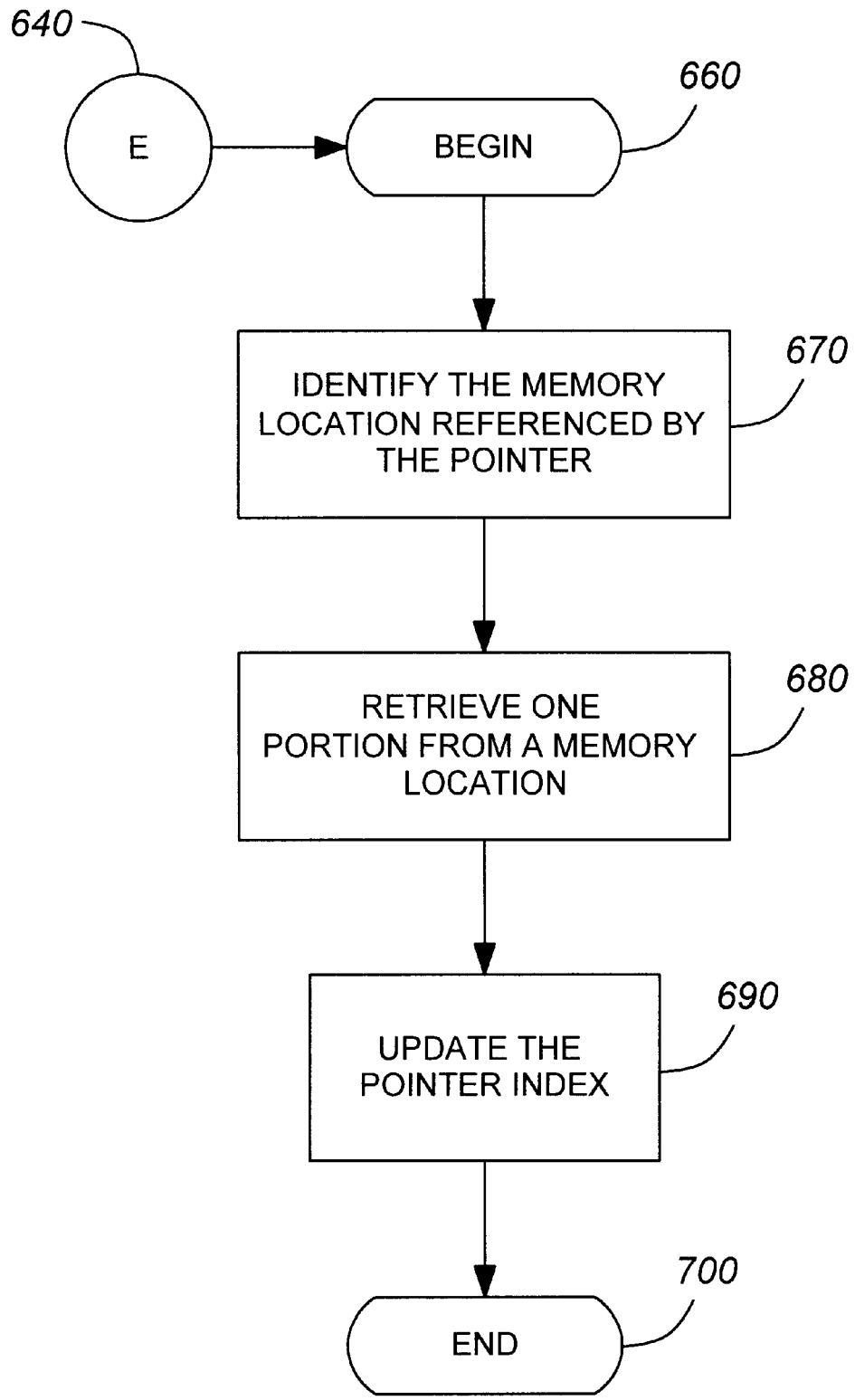
FIG. 11 is a flowchart detailing a sub-process for retrieving one portion of the DTU from memory according to the third embodiment of the present invention.

FIG. 11 follows connector E 640 which begins a new process at step 660. The first step 670 is in identifying the memory location for a single portion which is referenced by the pointer. The next step 680 retrieves one portion from the memory location in the first memory bank. The controller then updates the pointer index in step 690 and the process ends in step 700.

Figure 12:
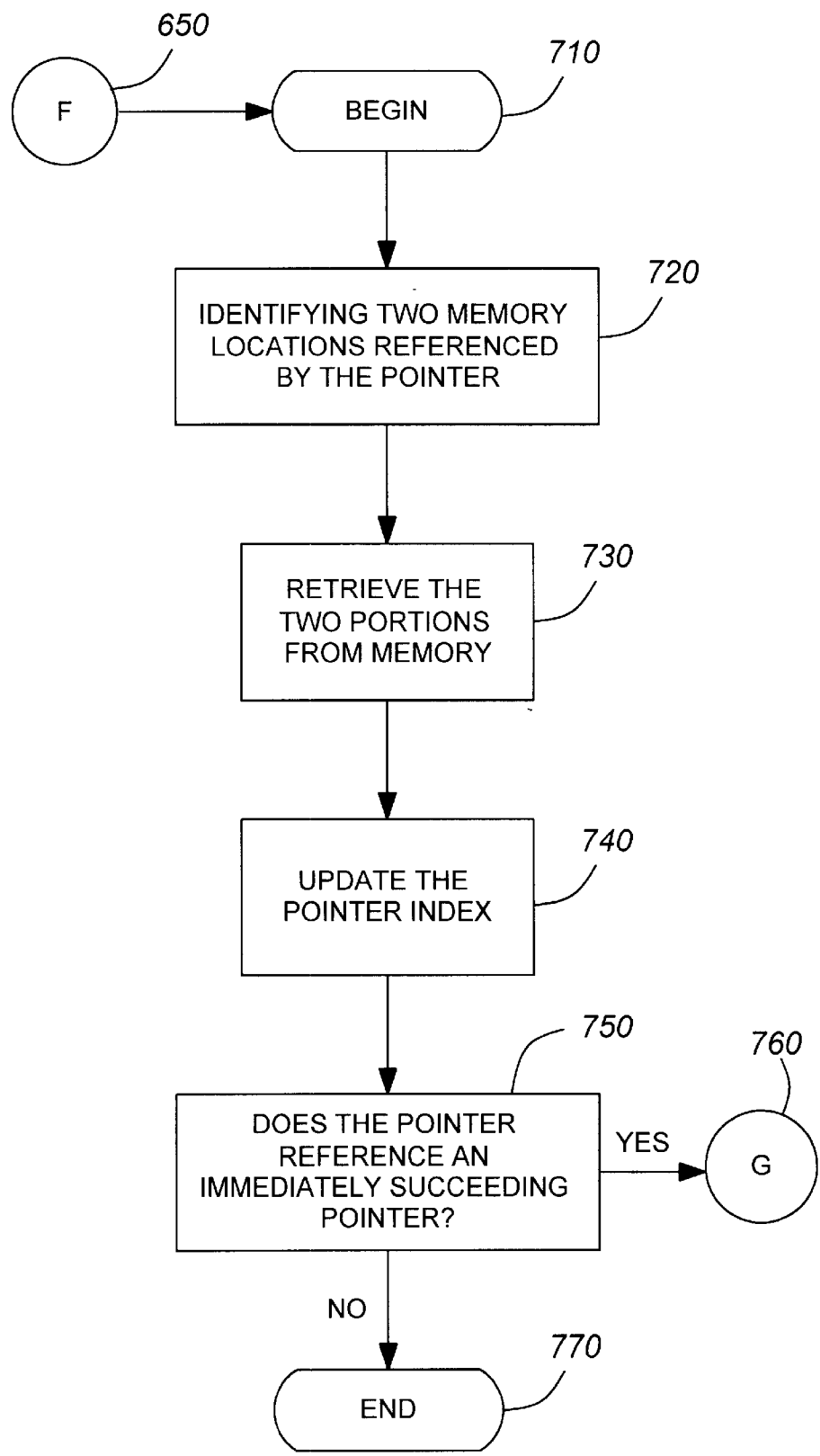
FIG. 12 is a flowchart detailing a sub-process for retrieving at least two potions of a DTU from memory according to the second embodiment of the present invention.

FIG. 12 follows connector F 650 which begins a new process at step 710. The first step 720 is to identify the two memory locations referenced by the pointer. Once identified, the processor retrieves the two portions in step 730, a first portion from a first memory bank and a second portion from a second memory bank. The pointer index is then updated in the controller 30 in step 740. The next step 750 determines if the pointer from step 720 references an immediately succeeding pointer in pointer memory. If yes, then connector G 760 is followed back to repeat step 620. If not, then process ends at step 770.

This enhanced pointer structure and method for increasing the amount of data transferred to buffer memory may be utilized in a number of applications. Any system that buffers DTUs must deal with issues of inefficiency when transferring DTUs of different lengths to and from buffer memory. The enhanced write capabilities derived from an enhanced pointer structure may be implemented in a variety of data traffic management systems, fixed size segment switch cores, routers and other network devices.

In addition, the pointer structure may be modified such that a single pointer may reference a plurality of memory banks. The S/D indicator may be modified to indicate the number of memory banks referenced by a single pointer. This modification would enable the system buffer multiple segments into buffer memory in one processing cycle.

We claim:

1. A system for processing incoming data transmission units having different sizes, the system including:
   a) a first memory means having at least one set of two parallel banks;
   b) a second memory means containing a plurality of pointers, each pointer being able to simultaneously reference two independently parallel memory locations within one of the at least one set of two parallel memory banks, each of the two parallel memory banks in a set having parallel memory locations referenced by each pointer;
   c) processing means for receiving an incoming data transmission unit and dividing the incoming data transmission unit into at least two fixed size segments and writing the at least two fixed size segments in the first memory means; and
   d) controlling means for updating each index pointer that points to one pointer of the plurality of pointers in the second memory means and sending the index pointer to the processing means, the pointer being one of the plurality of pointers contained in the second memory means.

2. A system as defined in claim 1, wherein the first memory means comprises a plurality of sets of two parallel memory banks.

3. A system as defined in claim 1, wherein each pointer contains a field indicator that indicates whether one or two memory banks with a parallel memory bank are referenced.

4. A data traffic management system for processing incoming data transmission units of different size, the data traffic management system including:
   (a) a first memory means having at least one set of two parallel banks;
   (b) a second memory means containing a plurality of pointers, each pointer being able to simultaneously reference two independently parallel memory locations within one of the at least one set of two parallel memory banks, each of the two parallel memory banks in a set having parallel memory locations referenced by each pointer;
   (c) processing means for receiving an incoming data transmission unit and dividing the incoming data transmission unit into at least two fixed size segments and writing the at least two fixed size segments in the first memory means; and
   (d) controlling means for updating each index pointer that points to one of the pointers in the second memory means and sending the index pointer to the processing means, the pointer being one of the plurality of pointers contained in the second memory means.

5. A data traffic management system as defined in claim 4, wherein the data traffic management system manages the input of a switch core.

6. A method of processing data transmission units having different sizes, the method including the steps of:
   (a) determining the size of the data transmission unit;
   (b) if the size of the data transmission unit is greater than a predetermined fixed size of a segment, executing the following steps:
      (b1) dividing the data transmission unit into at least two portions, each portion having a maximum size equal to the predetermined fixed size of a segment;
      (b2) retrieving at least one and at most two portions created in step (b1) from the data transmission unit;
      (b3) if one portion is retrieved from step (b2), executing the following steps:
         (b3-1) sending a signal to a controlling means, the signal indicating that one portion has been retrieved;
         (b3-2) retrieving a write index from the controlling means and transferring it to a processing means, the write index containing a memory address;
         (b3-3) assigning the memory address to the portion retrieved in step (b2);
         (b3-4) assigning a pointer to reference a memory location using the memory address assigned in step (b3-3);
         b3-5) setting a field indicator in the pointer of step (b3-4) to indicate that one portion is being referenced;
         b3-6) storing the portion referenced in step (b3) in a memory location of a first memory bank, the memory location having the memory address assigned in step (b4-3);
         (b3-7) storing the pointer assigned in step (b3-4) in a pointer memory; or
      (b4) if two portions are retrieved from step (b2), executing the following steps:

(b4-1) sending a signal to a controlling means, the signal indicating that two portions have been retrieved;

(b4-2) retrieving a write index from the controlling means and transferring it to a processing means, the write index containing a memory address common to a first memory bank and a second memory bank;

(b4-3) assigning the common memory address to each of the two portions;

(b4-4) assigning a pointer to reference two memory locations using the memory address assigned in step (b4-3);

(b4-5) setting a field indicator in the pointer assigned in step (b4-4) to indicate that two portions are referenced, the two portions comprising a first portion and a second portion;

(b4-6) storing the first portion from step (b4-5) in a memory location in the first memory bank and storing the second portion in a memory location in the second memory bank, both memory locations having the memory address assigned in step (b4-3);

(b4-7) storing the pointer assigned in step (b4-4) in a pointer memory;

(b4-8) if there are at least one and at most two portions to be retrieved from the data transmission unit, assigning the pointer to reference a pointer assigned to the at least one and at most two portions to be retrieved; and (b4-9) repeating step b2) to b4), until the data transmission unit has been retrieved.

7. A method as defined in claim 6, further including the steps of:

(c) if the size of the data transmission unit is not greater than a predetermined fixed size of a segment, executing the following steps:

(c1) sending a signal to a controlling means, the signal indicating that a single segment has been retrieved;

(c2) retrieving a write index from the controlling means and transferring it to a processing means, the write index pointing to a memory address;

(c3) assigning the memory address referenced in step (c2) to the single segment;

(c4) assigning a pointer to reference a memory location using the memory address assigned in step c3);

(c5) setting a field indicator in the pointer to indicate that a single data transmission unit is being referenced;

(c6) storing the data transmission unit in a memory location in a first memory bank;

(c7) storing the pointer in pointer memory.

8. A method of processing a request for retrieving a data transmission unit from memory, the method including the steps of:

(a) sending a signal to a controlling means, the signal indicating that a data transmission unit identified in the signal has been requested;

(b) retrieving a pointer index from the controlling means and transferring it to a processing means;

(c) reading a pointer from the pointer memory corresponding to the pointer index retrieved in step (b);

(d) determining whether one or two portions are referenced by the pointer;

(e) determining whether the pointer references an immediately succeeding pointer in the pointer memory;

(f) if one portion is referenced in step (d), executing the following steps:

(f1) identifying a memory location referenced by the pointer using a memory address contained in the pointer;

(f2) retrieving the referenced portion from the memory location in a first memory bank; or (g) if two portions are referenced, executing the following steps:

(g1) identifying two memory locations each referenced by the pointer using a memory address contained in the pointer;

(g2) retrieving a first portion from a first memory location in a first memory bank and retrieving a second portion from a second memory location in a second memory bank, both memory locations identified in step (g1);

(g3) incrementing the pointer index;

(g4) if the pointer references the immediately succeeding pointer determined in step (e), repeating steps (c) to (g).

* * * * *